Patented July 6, 1954

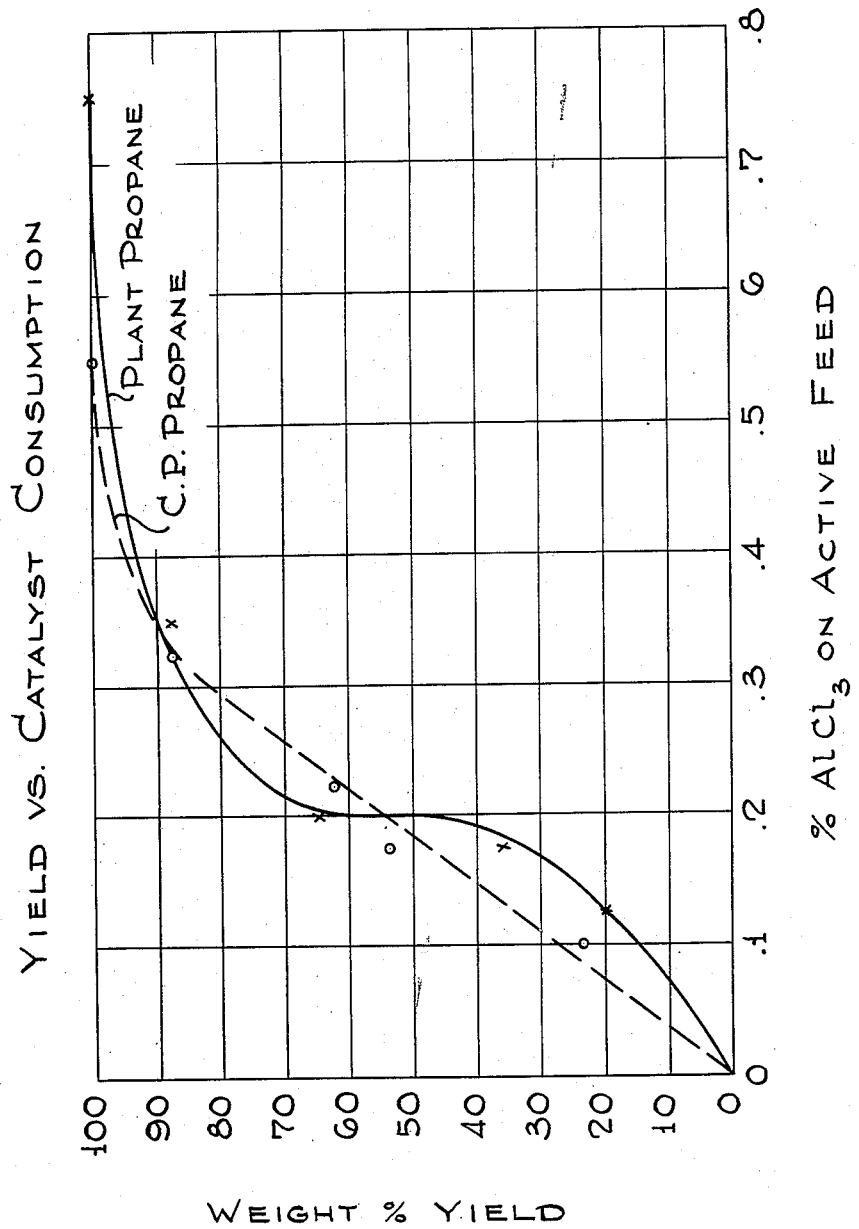

2,683,138

UNITED STATES PATENT OFFICE 2,683,138

PROPYLENE-ISOOLEFIN-CYCLIC OLEFIN TRIPOLYMER

Hans G. Goering, Elizabeth, and Julius P. Rocca, Linden, N. J., assignors to Standard Oil Development Company, a corporation of Delaware Application August 20, 1949, Serial No. 111,418

4 Claims. (Cl. 260—80.5)

This invention relates to the preparation of new and useful copolymers of hydrocarbons having different properties than those of the pure individual constituents employed in the preparation of these copolymers.

For the production of copolymers according to this invention, it is necessary to employ at least three starting materials: (1) a polymerizable aliphatic tertiary olefin, (2) a non-tertiary olefin, and (3) a monoolefin containing a cyclic nucleus.

The aliphatic tertiary olefin is preferably one having 4 to 8 or 10 carbon atoms capable of forming by itself (under suitable conditions) a linear polymer having a molecular weight of at least 800, as determined by the viscosity method explained in Staudinger's book, "Die Hochmolekularen Organischen Verbindungen," H. Staudinger, Berlin 1932, Verlag Von Julius Stringer, page 56. A particularly desirable olefin for this purpose is an isoolefin, especially a methyl 2-delta-1 olefin such as isobutylene, methyl-2 butene-1, etc. These compounds form high molecular weight linear polymers which are plastic solids, substantially saturated with respect to hydrogen (iodine number not more than about 10, and generally between 1 and 5). This type of polymerization is attributed to olefins having the general formula $R(R')C=CH_2$ in which R and R' are alkyl groups, preferably having 1 to 4 or 5 carbon atoms, and R preferably being different from R'.

The second ingredient is a non-tertiary olefin, such as ethylene, propylene, butene-1, butene-2, secondary amylenes, etc.

The third ingredient is an olefinic compound containing a cyclic nucleus, preferably an aromatic nucleus and includes styrene, cyclohexene, indene, coumarone, divinyl benzene, dipentene, pinene, alpha phellandrene, etc.

The first two ingredients of this reaction may be found associated together in crude refinery cuts, such as a refinery $C_4$ cut, a refinery $C_5$ cut, etc.

By mixing the three monomers and subjecting the mixture to polymerization a soft resin is obtained.

Before polymerization it is desirable to make sure that the reaction mixture is present in one phase, i. e. that no substantial separation of the constituents has taken place. If the materials are immiscible, a mutual solvent for both may be added to obtain homogeneity. Such a solvent may be ethylene, propane, butane, cyclohexane, liquid carbon dioxide, sulfur dioxide, methyl chloride, chloroform, trichlorethane, carbon tetrachloride, dichlorethylene, acid treated naphtha, and the like.

The polymerization may be carried out at temperatures from 50° C. to 0° C. or lower, to —44° C. When employing isobutylene as the tertiary olefin it is desirable to use temperatures not above 0° C. preferably —20° C. to —40° C. Higher temperatures up to 50° C. may be used with higher molecular weight tertiary olefins. The mixture is cooled to the desired temperature and an active halide catalyst is added, such as boron fluoride, aluminum chloride, titanium chloride, tin tetrachloride and the like. In the case of boron fluoride, only a small amount of the gas (0.01 to 0.1%) need be bubbled through, since the polymerization is quite violent and instantaneous. If a solvent such as propane or ethylene is employed, the heat of polymerization causes evaporation of some of the solvent, and this may be recompressed and used again in the process. Nonvolatile diluents, e. g. mineral lube oils, may also be present. Pressures of 1 to 100 atmospheres or more may be used.

After completion of the polymerization, residual catalyst is removed by washing the product with water and finally with dilute aqueous caustic soda. The volatile solvent may be removed or not.

The copolymers produced according to this process are interesting in that they generally acquire desirable modified properties of the individual polymers, yet they are not mechanical mixtures but true chemical compounds. They are also quite resistant to oxidation and attack by acids and alkalies. The structure of such compounds depends upon the proportions of the individual ingredients employed.

The proportion of the monomers employed in the mixture may vary from

1–25% propylene
24–98% isoolefin
1–75% cyclic olefin

By adjusting the proportions of the three raw materials, copolymers of substantially any desired hardness, melting point, plasticity, etc., may be obtained.

The invention will be more clearly understood by the following examples:

EXAMPLE 1

100 grams isobutylene was mixed with 240 grams of styrene and cooled to —25° C. by use of a mixture of 500 cc. ethyl chloride, and 1000 cc. of a $C_3$ cut containing 60 grams of propylene as diluent refrigerant, a solution of aluminum chloride dissolved in ethyl chloride was added. The reaction was violent and complete in 25 minutes. The catalyst was neutralized with isopropyl alcohol and the product was washed with water and dried at 250° C. for one-half hour. A substantially 100% yield of a yellowish-resinous material was formed.

EXAMPLE 2

Two series of experiments were carried out in one of which 120 grams of isobutylene (33.4%) was mixed with 240 grams of styrene (66.6%) and cooled to −25° C. by means of a diluent refrigerant consisting of 500 cc. of ethyl chloride and 1000 cc. of a $C_3$ containing 40 grams of propylene. In the other series of experiments 160 grams of isobutylene (40% by weight) was mixed with 240 grams of styrene (60% by weight) using as the diluent-refrigerant 500 cc. of ethyl chloride and 1000 cc. of chemically pure propane, containing no propylene. In both cases the reaction was carried out as in Example 1. From the data given in the table below it is evident that when pure propane is used as the diluent-refrigerant the percent styrene in the resin is substantially the same as that calculated from the yield assuming only the two monomers are reacting. However, when the diluent-refrigerant contains propylene it is evident that the reaction proceeds in a similar manner to that when pure propane is used as the refrigerant in the ratio of the isobutylene to styrene (67-33 weight percent) up to 65% yield when the propylene starts to copolymerize and the reaction proceeds to 100% conversion to form a resin containing 60% styrene which is equivalent to the weight in the original charge, including propylene.

TABLE I

*Comparison of the mechanism of the reaction made with plant propane, and resins made with C. P. propane at varying conversion levels*

USING PLANT PROPANE

| Run No. | Wt. Percent Yield (approx.) | Percent Styrene in Resin (as calc. from yield) | Percent Styrene in Resin (as calc. from C/H) |
|---|---|---|---|
| 1 | 20 | 65 | 72 |
| 2 | 36 | 75 | 73 |
| 3 | 46 | 72 | 71 |
| 4 | 65 | 72 | 69 |
| 5 | 74 | 68 | 66 |
| 6 | 88 | 69 | 66 |
| 7 | 100 | 60 | 61 |

Feed:
  240 gms. styrene, 66.6% by wt.
  120 gms. $IsoC_4$, 33.4% wt.
  40 gms. propylene (in propane)
  1,000 cc. propane
  500 cc. Eth. Cl

USING C. P. CYLINDER PROPANE

| Run No. | Wt. Percent Yield (approx.) | Percent Styrene in Resin (as calc. from yield) | Percent Styrene in Resin (as calc. from C/H) |
|---|---|---|---|
| 8 | 24 | 58 | 59 |
| 9 | 54 | 62 | 60 |
| 10 | 63 | 62 | 58 |
| 11 | 88 | 62 | 58 |
| 12 | 100 | 60 | 58 |

Feed:
  240 gms. styrene, 60% wt.
  160 gms. $IsoC_4$, 40%
  1,000 cc. propane
  500 cc. Eth. Cl In Figure 1 is shown the catalyst consumption curve for the above two reactions. The slopes of the curves are similar up to 50% yield when the $C_3$ cut-refrigerated reaction shows a rapid increase. This represents the period of propylene polymerization after which the two curves have substantially the same slope.

EXAMPLE 3

Another series of experiments were carried out in which the styrene-isobutylene:propylene ratio, the catalyst, the refrigerant, and the temperature were varied. The data are shown in the following table:

TABLE II

*Preparation of tri-polymer, styrene, isobutylene and propylene*

| Run No. | Percent Styrene | Percent Iso-butylene | Percent Propylene | Catalyst | Refrigerant | React. Temp. °C. | C/H Ratio | Soft. Pt., °C. | Color | Product Description | Int. Visc. |
|---|---|---|---|---|---|---|---|---|---|---|---|
| 13 | 58 | 24 | 18 | $BF_3$ in Ethylene | Propane | −44 | 8.54 | 91 | Amber | Resin | 0.17 |
| 14 | 52 | 24 | 18 | $AlCl_3$ in MeCl | MeCl | −23 | 8.53 | 94 | White | do | 0.13 |
| 15 | 50 | 34 | 16 | $BF_3$ in Ethylene | Propane | −44 | 8.15 | 80 | Amber | do | 0.20 |
| 16 | 50 | 34 | 16 | $AlCl_3$ in MeCl | MeCl | −23 | 8.20 | 85 | White | do | 0.15 |
| 17 | 19 | 67 | 14 | $BF_3$ in Ethylene | Propane | −44 | 6.75 | Soft | do | Soft Rubbery | 0.23 |
| 18 | 9 | 75 | 16 | do | do | −44 | 6.34 | do | do | do | 0.35 |

EXAMPLE 4

A refinery $C_5$ cut having the following composition:

| Compound | Vol. Percent |
|---|---|
| Butane | 0.4 |
| Isopentane | 22.6 |
| N-pentane | 20.0 |
| Tert. $C_5$ Unsat. | 11.6 } 24.5 |
| 2nd $C_5$ Unsat. | 12.9 |
| $C_6+$ | 32.5 | was copolymerized with styrene at temperatures from 20 to 40° C. in the presence of aluminum chloride dissolved in ethyl chloride. The following data were obtained:

TABLE III

| Run No. | $C_5$-Cut | Styrene, g. | G. $AlCl_3$/100 cc. Eth. Cl | Volume Used, cc. | Efficiency, g. resin/g. $AlCl_3$ | Reaction Time, Min. | Reaction Temp., °C. | Yield percent | Soft. Pt. of Resin | Remarks |
|---|---|---|---|---|---|---|---|---|---|---|
| 1 | 1,000 g. containing 245 g. $C_5$ unsat. | 400 | 4.8 | 325 | 34 | 59 | 40 to 28 | 82 | Very Soft | Ice Water condenser used (lost Eth. Cl). |
| 2 | 1,000 g. containing 245 g. $C_5$ unsat. | 750 | 3.1 | 500 | 61 | 55 | 40 to 23 | 95 | 70° C | Dry Ice condenser used—no gas lost. |

These copolymers are especially suitable as addition agents to mineral or fatty oils in concentrations of 0.01 to 10% for increasing viscosity and viscosity index. They may be added to greases, resins, rubbers (such as caoutchouc, crepe, smoke sheet, guayule, polymerized butadiene or isoprene, polychlorprene, terpene-maleic acid polymers and derivatives, polyolefin sulfides, halogenated rubbers, haloformed rubber, such as that obtained by reacting rubber with chlorstannic acid, polyisobutylene, benzene-ethylene dichloride condensation product, and the like) with or without the addition of vulcanizing agents followed by curing. Pigments, dyes, antioxidants, etc., may be added to the copolymers. The copolymers may also be mixed with powdered or granular solids, e. g. carbon black, ZnO, clay, chalk, etc., mineral or esterwaxes asphalts, polysulfones, coating compositions such as paints, varnishes and lacquers, cellulose esters and ethers, self supporting films, and the like. The copolymers can also be halogenated or reacted with sulfur chloride to produce new useful derivatives.

These copolymers, especially the thermoplastic ones, are also desirable for use in coating or impregnating paper, cloth, wood, metal, bricks, tiles, etc., preserving fruits, vegetables, shrubbery, etc., sealing cuts and wounds on trees, roofing paper, shingles, substitute for tar and asphalt for roofing, paving, making building blocks, etc., as a binder for cork, asbestos, straw, etc., in making synthetic floor covering of the linoleum type, or artificial building boards or roof shingles, as a binder for making laminated products such as paper-paper, cloth-cloth, paper-metal foil, glass-glass (alone or with tough unbreakable film intermediate), and many other uses.

EXAMPLE 5

The products obtained in run numbers 17 and 18 of Example 3 were tested as V. I. improvers in lubricating oil in comparison with polybutene. The results set forth below show that the tripolymer is fully the equal of polybutene as a V. I. improver.

TABLE IV

V. I. study in lubricating oil

| Sample | Percent Styrene | Approx. Mol. Wt. | Polymer Conc. | Visc. @ 100° F. | Visc. @ 210° F. | V. I. |
|---|---|---|---|---|---|---|
| 101-5 | 18.5 | 7,000 | 1.78 | 40.6 | 6.77 | 128 |
|  |  |  | 3.56 | 50.7 | 8.38 | 135 |
|  |  |  | 7.12 | 80.8 | 12.64 | 138 |
| 101-6 | 9.1 | 11,000 | 1.0 | 38.2 | 6.05 | 123 |
|  |  |  | 3.0 | 48.1 | 7.81 | 132 |
|  |  |  | 6.0 | 72.2 | 11.12 | 135 |
| Polybutene |  | 11,000 | 1.30 | 48.6 | 7.74 | 128 |
|  |  |  | 2.59 | 70.5 | 10.71 | 134 |

The following data show that the tripolymer is more stable than low molecular weight polybutene. For example, polybutene of 7,000 molecular weight is found to give a viscosity breakdown of 15.0% whereas the tripolymer of similar molecular weight loses only 3.1%. The data are set forth below:

TABLE V

Breakdown data in recycle pressure viscosimeter

[100 passes under 600# pressure @ 25 cs. @ 100° F. in white oil.]

| Sample | Mol. Wt. | Mol. Ratio IsoC$_4$=/ Styrene and Propylene | Breakdown, Percent Loss in Visc. @ 100° F. |
|---|---|---|---|
| 101-5 | 7,000 | 2.3 | 3.1 |
| Polybutene | 7,000 |  | 15.0 |
| 101-6 | 11,000 | 3.2 | 17.2 |
| Polybutene | 11,000 |  | 23.0 |

The nature of the present invention having thus been set forth, what is claimed as new and useful and desired to be secured by Letters Patent is:

1. The process which consists in copolymerizing about 50–75% by weight of styrene, 25–35% of isobutylene and 10–18% of propylene, at a temperature of −44° C. to 0° C., in the presence of a catalyst selected from the group consisting of boron fluoride and aluminum chloride.

2. The process which consists in copolymerizing about 60% by weight of styrene, about 30% by weight of isobutylene, and about 10% by weight of propylene, at a temperature of about −25° C., in the presence of a catalyst consisting of aluminum chloride dissolved in ethyl chloride, the amount of said catalyst being at least 0.2% by weight of aluminum chloride based on the reactants.

3. A product consisting essentially of tripolymer of 50–75% by weight of styrene, about 25–35% by weight of isobutylene and about 10–18% by weight of propylene, said tripolymer being a resin of amber to white color, and having an intrinsic viscosity in the range of about 0.13 to 0.20 and having a softening point in the range of 80–94° C.

4. A product consisting essentially of a tripolymer of about 60% by weight of styrene, about 30% by weight of isobutylene, and 10% by weight of propylene.

References Cited in the file of this patent

UNITED STATES PATENTS

| Number | Name | Date |
|---|---|---|
| 2,118,945 | Reppe | May 31, 1938 |
| 2,274,749 | Smyers | Mar. 3, 1942 |
| 2,327,705 | Frolich | Aug. 24, 1943 |
| 2,421,082 | Pier | May 27, 1947 |
| 2,446,536 | Hardy | Aug. 10, 1948 |